United States Patent
Jansen et al.

(10) Patent No.: US 9,695,493 B2
(45) Date of Patent: *Jul. 4, 2017

(54) STEEL STRIP HAVING A LOW SI CONTENT

(71) Applicant: TATA STEEL IJMUIDEN BV, Ijmuiden (NL)

(72) Inventors: Egbert Jansen, Purmerend (NL); Edward Anton Frederik Span, Nieuw-Vennep (NL); Richard Mostert, Heemskerk (NL); Theo Arnold Kop, Haarlem (NL)

(73) Assignee: TATA STEEL IJMUIDEN BV, Ijmuiden (NL)

( * ) Notice: Subject to any disclaimer, the term of this patent is extended or adjusted under 35 U.S.C. 154(b) by 115 days.

This patent is subject to a terminal disclaimer.

(21) Appl. No.: 14/389,697

(22) PCT Filed: Apr. 5, 2013

(86) PCT No.: PCT/EP2013/001015
§ 371 (c)(1),
(2) Date: Sep. 30, 2014

(87) PCT Pub. No.: WO2013/149732
PCT Pub. Date: Oct. 10, 2013

(65) Prior Publication Data
US 2015/0064497 A1  Mar. 5, 2015

(30) Foreign Application Priority Data

Apr. 5, 2012 (EP) ..................... 12002492

(51) Int. Cl.
| | |
|---|---|
| C22C 38/58 | (2006.01) |
| C23C 2/06 | (2006.01) |
| C22C 38/00 | (2006.01) |
| C22C 38/02 | (2006.01) |
| C22C 38/06 | (2006.01) |
| C22C 38/28 | (2006.01) |
| C22C 38/38 | (2006.01) |
| B32B 15/01 | (2006.01) |
| C22C 38/44 | (2006.01) |
| C22C 38/46 | (2006.01) |
| C22C 38/48 | (2006.01) |
| C22C 38/50 | (2006.01) |
| C22C 38/54 | (2006.01) |
| C21D 8/02 | (2006.01) |
| C22C 38/22 | (2006.01) |
| C22C 38/24 | (2006.01) |
| C22C 38/26 | (2006.01) |
| C22C 38/32 | (2006.01) |

(52) U.S. Cl.
CPC ............ *C22C 38/58* (2013.01); *B32B 15/013* (2013.01); *C21D 8/0226* (2013.01); *C21D 8/0236* (2013.01); *C21D 8/0263* (2013.01); *C21D 8/0273* (2013.01); *C22C 38/001* (2013.01); *C22C 38/002* (2013.01); *C22C 38/004* (2013.01); *C22C 38/02* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/44* (2013.01); *C22C 38/46* (2013.01); *C22C 38/48* (2013.01); *C22C 38/50* (2013.01); *C22C 38/54* (2013.01); *C23C 2/06* (2013.01); *C21D 2211/005* (2013.01); *C21D 2211/008* (2013.01); *Y10T 428/12799* (2015.01)

(58) Field of Classification Search
CPC ...................................... C22C 38/58
USPC ................. 148/330, 333–335; 420/103, 112
See application file for complete search history.

(56) References Cited

U.S. PATENT DOCUMENTS

| | | |
|---|---|---|
| 2003/0047256 A1 | 3/2003 | Kami et al. |
| 2003/0111144 A1 | 6/2003 | Matsuoka et al. |
| 2009/0022619 A1 | 1/2009 | Hamada et al. |
| 2010/0139816 A1 | 6/2010 | Hanlon et al. |
| 2010/0330392 A1 | 12/2010 | Ono et al. |
| 2012/0118439 A1 | 5/2012 | Ono et al. |
| 2012/0282487 A1 | 11/2012 | Ogawa et al. |

(Continued)

FOREIGN PATENT DOCUMENTS

| | | |
|---|---|---|
| EP | 1193322 A1 | 4/2002 |
| EP | 1195447 A1 | 4/2002 |
| EP | 1995339 A1 | 11/2008 |

(Continued)

OTHER PUBLICATIONS

International Search Report dated May 17, 2013 from International Application PCT/EP2013/001015 to Tata Steel Ijmuiden BV filed Apr. 5, 2013.

(Continued)

*Primary Examiner* — Brian Walck
(74) *Attorney, Agent, or Firm* — Vorys, Sater, Seymour and Pease LLP

(57) ABSTRACT

A dual phase or complex phase steel strip showing no tigerstripes. The steel strip having an ultimate tensile strength Rm classifying for 1000 MPa steel category, includes (in mass percent) C 0.09-0.19%; Mn 1.9-2.6%; Si at most 0.1%; Cr 0.4-0.8%; Mo at most 0.3%; Ni at most 0.4%; Al 0.02-1.3%; and optionally one or more of the following elements: Nb at most 0.08%; P equal to or more than 0.0005%; N equal to or less than 0.015%; Ti equal to or less than 0.1%; V equal to or less than 0.1%; B equal to or less than 0.01%; wherein the sum of Cr, Mo and Ni is at least 0.5%; the balance being Fe and inevitable impurities.

15 Claims, No Drawings

(56) References Cited

U.S. PATENT DOCUMENTS

2013/0017411 A1  1/2013  Hamada et al.
2013/0071687 A1  3/2013  Takagi et al.

FOREIGN PATENT DOCUMENTS

| EP | 2169091 A1 | 3/2010 |
|---|---|---|
| EP | 2434027 A1 | 3/2012 |
| EP | 2447390 A1 | 5/2012 |
| JP | 2003-193190 A | 7/2003 |
| JP | 2006-052455 A | 2/2006 |
| JP | 2010-519415 A | 6/2010 |
| JP | 2011-214101 A | 10/2011 |
| JP | 2012-012703 A | 1/2012 |
| WO | 2008102009 A1 | 8/2008 |
| WO | 2011055844 A1 | 5/2011 |
| WO | 2013149734 A1 | 10/2013 |

OTHER PUBLICATIONS

Notification of Transmittal of the International Preliminary Report on Patentability dated Jul. 23, 2014 from International Application PCT/EP2013/001015 to Tata Steel Ijmuiden BV filed Apr. 5, 2013.
Office Action issued Feb. 21, 2017 for JP Patent Application No. 2015-503785.

STEEL STRIP HAVING A LOW SI CONTENT

CROSS-REFERENCE TO RELATED APPLICATIONS

This is a §371 US National Stage Application of International Application No. PCT/EP2013/001015 filed on Apr. 5, 2013, claiming the priority of European Patent Application No. 12002492.2 filed on Apr. 5, 2012.

The invention relates to a steel strip having a low silicon content, in particular a hot dip galvanised steel strip, more particularly a hot dip galvanised dual phase or complex phase steel strip.

Dual phase (DP) steel strip having balanced properties regarding strength and ductility (formability) is well known in the art. In cold rolled DP steel strip silicon is a very common alloying element for reason of cost reduction and/or control, solid solution strengthening, avoiding carbide precipitation, which is favourable in view of ductility (elongation). However, Si induces surface-related problems. Si oxides formed during processing in the hot strip mill and annealing line increase the risk of the occurrence of so-called "tiger stripes", which affect appearance and coatability. Therefore, commonly the use of silicon in DP steel is restricted, especially in hot dip galvanized (HDG) DP steel. Typically Si content in DP steel is 0.2-0.3 wt. % in HDG DP steel sheet and 0.2-0.5 wt. % in uncoated steel sheet.

From EP 2169091 A1 a high-strength hot-dip galvanized steel sheet with low yield strength is known. The steel composition comprises, in mass percent, 0.01-0.12% C, 0.2% or less Si, less than 2% Mn, 0.04% or less P, 0.02% or less S, 0.3% or less sol. Al, 0.01% or less N, 0.3-2% Cr, also satisfying the condition 2.1≤[Mneq]≤3 and 0.24≤[% Cr]/[% Mn], the balance being iron and inevitable impurities. The steel microstructure is composed of ferrite and a second phase, wherein the area ratio of the second phase is 2-25%, the area ratio of pearlite or bainite in the second phase is 0-20%, the average grain diameter of the second phase is 0.9-7 micrometer, and the area ratio of grains with a grain diameter of less than 0.8 micrometer in the second phase is less than 15%. The steel composition is exemplified by a number of examples based on a low Si and low Al alloying philosophy.

It is an object of the present invention to provide a steel composition, such as a dual phase (DP) or complex phase (CP) steel composition, which combines desired microstructure properties regarding strength, in particular an ultimate tensile strength of at least 1000 MPa, and ductility and also with sufficient surface quality, in particular avoiding the occurrence of tiger stripes.

It is another object of the invention to provide such a steel composition having a good coatability.

According to the invention a steel strip having an ultimate tensile strength Rm classifying for 1000 MPa steel category, comprising (in mass percent)

C 0.09-0.19%;
Mn 1.9-2.6%;
Si at most 0.1%;
Cr 0.4-0.8%;
Mo at most 0.3%;
Ni at most 0.4%;
Al 0.02-1.3%;
and optionally one or more elements selected from the group consisting of:
Nb at most 0.08%;
P equal to or more than 0.0005%;
N equal to or less than 0.015%;
Ti equal to or less than 0.1%;
V equal to or less than 0.1%;
B equal to or less than 0.01%.
wherein the sum of Cr, Mo and Ni is at least 0.5%;
the balance being Fe and inevitable impurities and inevitable impurities.

Surprisingly it has been found that the steel composition according to the invention does not show tiger stripes at a high level of strength and formability properties.

Regarding the metallurgical aspects the following guidelines are deemed to apply:

C is 0.09-0.19%, preferably 0.12-0.17%. If C is above the upper limit, then it becomes difficult to assure good spot weldability. If C is below 0.09%, then the carbon content is too low to create DP or CP microstructures.

Si is at most 0.1%. Si has shown to be the major factor responsible for tiger stripes. In order to avoid the risk of the occurrence of these surface defects in a secure way, the amount is limited to a maximum of 0.1%. Preferably the Si content is equal to or less than 0.08%, more preferably 0.02-0.08%.

Usually the addition of Al and the addition of Si have a similar beneficial effect on the formability of steels. However, in view of tiger stripes Al has a negligible effect. Therefore Al is in the range of 0.02-1.3%. Preferably, Al is in the range of 0.02-0.35%.

Mn is present at a level of 1.9-2.6% thereby compensating the reduction of strength caused by the low Si content, preferably in the range of 2.10-2.50%. Cr, Mo and Ni are also present for strength and hardening reasons determining the DP or CP microstructure of the steel strip of the invention. According to the invention the total sum of these elements is at least 0.5%. The amounts of the individual elements are Cr 0.4-0.8%, more preferably more than 0.50 up to 0.70%;
Mo 0-0.3%, preferably less than 0.01%; and
Ni 0-0.4%, preferably less than 0.05%.

The steel strip composition according to the invention may optionally comprise is other alloying elements in small amounts. The sum of inevitable impurities and other alloying elements is advantageously less than 1.25%. Preferably the limits of the additional alloying elements and individual impurities are P equal to or more than 0.0005% and advantageously in the range of 0.005-0.05%
N at most 0.015%
Nb at most 0.08%, more preferably at most 0.04%
Ti at most 0.1%
V at most 0.1%
B at most 0.01%

In an advantageous embodiment the steel strip according to the invention has a microstructure (area %), comprising martensite 5-40%;
ferrite/upper bainite 30-95%;
lower bainite/tempered martensite 0-30%;
and optionally pearlite less than 5%.

Ferrite and martensite are required in view of work hardening and ductility. In CP products the martensite content should not be to high, since it affects yield strength. Bainite provide strength and balances local hardness differences in the microstructure. Advantageously the amount of pearlite is small, preferably about zero. Advantageously the grain size is less than 10 micrometer in view of strength.

In a preferred embodiment the steel strip is coated with a coating comprising Zn. Although the coating can be applied in various ways, hot dip galvanising is preferred using a standard GI coating bath. Other Zn coatings may also be applied. An example comprises a Zn alloy coating according to WO 2008/102009, in particular a zinc alloy coating layer consisting of 0.3-4.0% Mg and 0.05%-6.0% Al and optionally at most 0.2% of one or more additional elements along with unavoidable impurities and the remainder being zinc. An additional element typically added in a small amount of less than 0.2 weight %, could be selected from the group comprising Pb or Sb, Ti, Ca, Mn, Sn, La, Ce, Cr, Ni, Zr or Bi. Pb, Sn, Bi and Sb are usually added to form spangles. Preferably, the total amount of additional elements in the zinc alloy is at most 0.2%. These small amounts of an additional element do not alter the properties of the coating nor the bath to any significant extent for the usual applications. Preferably, when one or more additional elements are present in the zinc alloy coating, each is present in an amount <0.02 weight %, preferably each is present in an amount <0.01 weight %. Additional elements are usually only added to prevent dross forming in the bath with molten zinc alloy for the hot dip galvanising, or to form spangles in the coating layer.

The invention will be further illustrated by means of the following examples: Sheets having a composition as indicated in Table 1 below were manufactured by a usual cold rolling and continuous annealing process. E.g. steel blocks were casted from the composition and subsequently an industrial hot rolling simulation was performed. More specifically, a strip was hot rolled to a desired thickness, such as 4 mm, at a finishing temperature of 880° C. and a coiling temperature of 650° C. After hot rolling the strip was cold rolled to a final thickness of 1 mm and annealed as indicated below.

Example 1 was processed using different annealing treatments leading to 3 distinct tensile property sets as indicated in Table 2. Each treatment (see Table 3) comprises heating of the respective sheet to a maximum temperature T1, following which the sheet was cooled slowly (rate 1-10° C./s) down to the temperature T2. From T2 a rapid cooling (rate 20-60° C./s) occurred to T3, at which temperature the sheet was maintained for some time 40-100 sec.). Then the sheet thus treated was allowed to cool to ambient temperature in air.

For Examples 2-4 cold rolled strip is made via standard steel making and rolling routes as outlined above. After cold rolling the material is continuously annealed in standard annealing lines as outlined above. After heating to a temperature T1, slow cooling to T2 is carried out and subsequently a rapid cooling to temperature T3 (the relevant data are presented in Table 3). Next, the material is either a) further cooled to room temperature in Examples 2a and 3a, or b) for the GI (galvanized) Examples 2b, 2c, 3b and 4a-4c the strip is brought to the Zn-bath temperature, or c) for the GA Example 2d an additional standard GA (galvannealed) heating step is applied.

Table 4 presents the data concerning the microstructure and grain size of Examples 2-4. The CP variants, Examples 2a and 4a, have a microstructure, is comprising more than 1% of martensite, more than 10% of ferrite, more than 50% bainite+tempered martensite and less than 5% of pearlite. The microstructure of the DP variants, Examples 2b, 2c, 3a and 3b, was comprised of at least 5% of martensite, more than 50% of ferrite, optionally bainite+tempered martensite and less than 5% of pearlite.

The sheets were also visually examined for the presence of tiger strips. Tiger stripes were not observed. Also a good coatability was achieved.

TABLE 1

Composition Examples 1-4

| Example | C | Mn | P | S | Si | N | Al | Nb | B | Ti | V | Cr | Mo | Ni | Σ Cr + Mo + Ni |
|---|---|---|---|---|---|---|---|---|---|---|---|---|---|---|---|
| 1 | 0.14 | 2.29 | 0.001 | 0.0012 | 0.06 | <0.001 | 0.292 | | 0.0015 | 0.029 | | 0.54 | | | 0.54 |
| 2 | 0.148 | 2.225 | 0.011 | 0.002 | 0.051 | 0.0051 | 0.036 | 0.015 | 0.0001 | 0.001 | 0.005 | 0.545 | 0.003 | 0.022 | 0.570 |
| 3 | 0.160 | 2.178 | 0.010 | 0.003 | 0.057 | 0.0040 | 0.031 | 0.016 | 0.0001 | 0.027 | 0.006 | 0.540 | 0.003 | 0.028 | 0.571 |
| 4 | 0.129 | 2.210 | 0.012 | 0.002 | 0.054 | 0.0031 | 0.254 | 0.001 | 0.0019 | 0.042 | 0.007 | 0.549 | 0.006 | 0.031 | 0.586 |

TABLE 2

Physical properties Examples 1-4

| Example | Thickness (mm) | Rp (MPa) | Rm (MPa) | A80 (%) |
|---|---|---|---|---|
| 1a | 1.0 | 748 | 1094 | 6.1 |
| 1b | 1.0 | 691 | 1114 | 7.2 |
| 1c | 1.0 | 611 | 1093 | 9.5 |
| 2a | 1.5 | 864 | 1042 | 8.4 |
| 2b | 1.5 | 652 | 1040 | 11.4 |
| 2c | 1.5 | 709 | 1020 | 10.5 |
| 2d | 1.5 | 609 | 1003 | 13.3 |
| 3a | 1.5 | 582 | 1022 | 10.9 |
| 3b | 1.5 | 640 | 1007 | 12.7 |
| 4a | 1.5 | 896 | 1013 | 9.4 |
| 4b | 1.1 | 916 | 1031 | 7.1 |
| 4c | 1.5 | 784 | 983 | 11.1 |

TABLE 3

Annealing data Examples 1-4

| Example | T1 (° C.) | T2 (° C.) | T3 (° C.) |
|---|---|---|---|
| 1a | 850 | 680 | 380 |
| 1b | 840 | 680 | 475 |
| 1c | 840 | 600 | 475 |
| 2a | 860 | 675 | 320 |
| 2b | 800 | 620 | 480 |
| 2c | 820 | 690 | 490 |
| 2d | 850 | 700 | 470 |
| 3a | 810 | 620 | 275 |
| 3b | 800 | 700 | 480 |
| 4a | 850 | 630 | 400 |
| 4b | 860 | 650 | 420 |
| 4c | 840 | 640 | 440 |

TABLE 4

Microstructure Examples 2-4

| Example | Microstructure | Grain size |
|---|---|---|
| 2a | CP | <10 |
| 2b | DP | <5 |
| 2c | DP | <5 |

TABLE 4-continued

Microstructure Examples 2-4

| Example | Microstructure | Grain size |
|---|---|---|
| 2d | DP | |
| 3a | DP | <8 |
| 3b | DP | <5 |
| 4a | CP | <10 |
| 4b | CP | <10 |
| 4c | DP | |

The invention claimed is:

1. A steel strip having an ultimate tensile strength Rm of at least 1000 MPa, consisting of (in mass percent)
C 0.09-0.19%;
Mn 1.9-2.6%;
Si at most 0.1%;
Cr 0.4-0.8%;
Mo 0.003 to 0.3%;
Ni 0.022 to 0.4%;
Al 0.02-1.3%;
Nb at most 0.08%;
P 0 or equal to or more than 0.0005%;
N equal to or less than 0.015%;
Ti equal to or less than 0.1%;
V equal to or less than 0.1%;
B equal to or less than 0.01%;
wherein the sum of Cr, Mo and Ni is at least 0.5%;
the balance being Fe and inevitable impurities.

2. The steel strip according to claim 1, wherein Si is at most 0.08%, wherein the sum of Cr, Mo and Ni is 0.5% to 0.6%.

3. The steel strip according to claim 1, wherein (in mass percent)
C is 0.12-0.17%;
Mn is 2.10-2.50%;
Al is 0.02-0.35%.

4. The steel strip according to claim 2, wherein
Cr is 0.50-0.70%;
Mo is 0.003 to 0.01%;
Ni is 0.022 to 0.05%;
B is 0.0001 to 0.01%;
wherein the sum of Cr, Mo and Ni is 0.525% to 0.6%.

5. The steel strip according to claim 1, wherein
Nb is 0.001 to 0.04%
P is 0.005% to 0.05%.

6. The steel strip according to claim 1, having a microstructure consisting of, in area %,
martensite 5-40%;
ferrite/upper bainite 30-95%;
lower bainite/tempered martensite 0-30%;
and pearlite less than 5%.

7. The steel strip according to claim 1, having grain size less than 10 micrometer.

8. The steel strip according to claim 1, coated with a coating comprising Zn.

9. The steel strip according to claim 8, being hot dip galvanised.

10. The steel strip according to claim 8, wherein the coating consists of, in mass percent: 0.3-4.0% Mg and 0.05-6.0% Al and at most 0.2% of one or more additional elements selected from the group of Pb, Sb, Ti, Ca, Mn, Sn, La, Ce, Cr, Ni, Zr and Bi, along with unavoidable impurities and the remainder being zinc.

11. The steel strip according to claim 2, wherein (in mass percent)
C is 0.12-0.17%;
Mn is 2.10-2.50%;
Al is 0.02-0.35%.

12. The steel strip of claim 1, consisting of (in mass percent)
C 0.12-0.17%;
Mn 2.10-2.50%;
Si 0.02-0.08%;
Cr 0.50-0.70%;
Mo 0.003 to 0.3%;
Ni 0.022 to 0.4%;
Al 0.02-0.35%;
V 0.005 to 0.1%;
B 0.0001 to 0.01,
wherein the sum of Cr, Mo and Ni is at least 0.525%;
the balance being Fe and inevitable impurities and inevitable impurities.

13. The steel strip of claim 1, wherein
Nb is at most 0.04%;
P is 0.0005% to 0.05%;
N is equal to or less than 0.015%;
Ti is equal to or less than 0.1%;
V is 0.005 to 0.1%; and
B is 0.0019 to 0.01%.

14. A steel strip having an ultimate tensile strength Rm of at least 1000 MPa, consisting of (in mass percent)
C 0.12-0.17%;
Mn 2.10-2.50%;
Si 0.02-0.08%;
Cr 0.50-0.70%;
Mo 0.003 to 0.01%;
Ni 0.022 to 0.05%;
Al 0.02-0.35%;
Nb at most 0.04%;
P 0.005 to 0.05%;
N equal to or less than 0.015%;
Ti equal to or less than 0.1%;
and one or more elements selected from the group consisting of:
V 0.005 to 0.1%;
B 0.0001 to 0.01%;
wherein the sum of Cr, Mo and Ni is at least 0.525%;
the balance being Fe and inevitable impurities,
having a microstructure consisting of, in area %,
martensite 5-40%;
ferrite/upper bainite 30-95%;
lower bainite/tempered martensite 0-30%;
and pearlite less than 5%.

15. The steel strip of claim 14, wherein B is 0.0019 to 0.01%.

* * * * *